United States Patent [19]

Steele et al.

[11] Patent Number: 4,692,290
[45] Date of Patent: Sep. 8, 1987

[54] PROCESS FOR DEVOLATILIZING MOLTEN OXYMETHYLENE POLYMER

[75] Inventors: Douglas W. Steele, Bishop; George S. Nash, Kingsville; John W. Dorsey, Bishop; Ronald S. Christy, Kingsville, all of Tex.; Timothy L. Burns, Edgewood, Ky.

[73] Assignee: Celanese Corporation, New York, N.Y.

[21] Appl. No.: 797,054

[22] Filed: Nov. 12, 1985

[51] Int. Cl.$^4$ ............................................. B29B 7/84
[52] U.S. Cl. .................................... 264/101; 159/2.2; 264/102; 264/143; 264/169; 264/211.23; 264/310; 264/331.22; 264/349; 264/DIG. 78; 366/75; 528/270
[58] Field of Search ................ 264/101, 102, 39, 143, 264/169, 176 F, DIG. 78, 310, 349, 211.23, 331.22; 425/381.2, 376 B, 203, 204; 528/270; 159/2.2; 366/75, 97

[56] References Cited

U.S. PATENT DOCUMENTS

| | | | |
|---|---|---|---|
| 2,735,840 | 2/1956 | Lynch | 264/102 |
| 3,027,352 | 3/1962 | Walling et al. | 264/176 F |
| 3,219,623 | 11/1965 | Berardinelli | 264/176 F |
| 3,318,848 | 5/1967 | Clark | 264/176 F |
| 3,418,280 | 12/1968 | Orgen | 264/176 F |
| 4,194,841 | 3/1980 | Tadmor | 425/376 B |
| 4,213,709 | 7/1980 | Valsamis | 425/376 B |
| 4,362,852 | 12/1982 | Pendlebury et al. | 264/176 F |
| 4,389,119 | 6/1983 | Valsamis et al. | 264/176 C |
| 4,486,099 | 12/1984 | Tadmor | 425/204 |
| 4,529,320 | 7/1985 | Mehta et al. | 366/75 |

Primary Examiner—Jeffery Thurlow
Attorney, Agent, or Firm—Andrew F. Sayko, Jr.

[57] ABSTRACT

A process is provided for removing volatile materials from a molten oxymethylene polymer, according to which the molten polymer is passed through a rotating disk polymer processor having at least three stages; a first devolatilization stage, then a stabilization stage and then a second devolatilization stage. The molten polymer in the first devolatilization stage is maintained at a temperature above its melting point in the temperature range of from about 160° C. to about 220° C. and at a vapor space pressure of from about 0.1 to about 300 Torr. The polymer in the stabilization stage is maintained in the molten state at a temperature of from 160° C. to about 220° C. The polymer in the second devolatilization stage is maintained in the molten state at a temperature of from about 160° C. to about 190° C. and at a vapor space pressure of from about 0.1 to about 100 Torr.

11 Claims, 2 Drawing Figures

PROCESS FOR DEVOLATILIZING MOLTEN OXYMETHYLENE POLYMER

FIELD OF THE INVENTION

This invention relates to a method of devolatilizing and stabilizing molten oxymethylene polymers. More particularly, this invention relates to a method of removing formaldehyde and other volatile materials, such as triethylamine and water from molten, extrudable and moldable oxymethylene polymers.

BACKGROUND OF THE INVENTION

Oxymethylene polymers, as that term is used herein and further defined below, means those polymers having recurring —$OCH_2$—units directly attached to each other. Such polymers have been known for many years. They may be prepared by the polymerization of anhydrous formaldehyde or by the polymerization of trioxane, which is a cyclic trimer of formaldehyde. Oxymethylene copolymers have at least one chain containing recurring oxymethylene units interspersed with —OR—groups in the main polymer chain, where R is a divalent radical containing at least two carbon atoms directly linked to each other and positioned in the polymer chain between the two valences, with any substituents on the R radical being inert, that is those which are free of interfering functional groups and will not induce undesirable reactions. Particularly preferred are copolymers which contain from 60 to 99.9 mol percent of recurring oxymethylene groups. The R may be, for example, an alkylene or substituted alkylene group containing at least two carbon atoms.

Among the copolymers which may be utilized are those having a structure comprising recurring units having the formula:

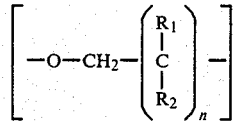

wherein n is an integer from zero to 5 and wherein n is zero in from 60 to 99.9 percent of the recurring units. $R_1$ and $R_2$ are inert substituents, that is, substituents which are free of interferring functional groups and will not induce undesirable reactions.

Particularly preferred oxymethylene copolymers are those having incorporated therein oxyalkylene units having adjacent carbon atoms which are derived from cyclic ethers having adjacent carbon atoms. These copolymers may be prepared by copolymerizing trioxane with a cyclic ether having the structure:

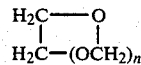

wherein n is an integer from zero to 2.

Examples of preferred polymers include copolymers of trioxane and cyclic ethers containing at least two adjacent carbon atoms such as the copolymers disclosed in U.S. Pat. No. 3,027,352, incorporated herein by reference. Among the specific cyclic ethers which may be used are ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl glycol formal; pentaerythritol diformal; paraldehyde; tetrahydrofuran and butadiene monoxide. As used in the specification and claims of this application, the term "copolymer" means polymers having two or more monomeric groups, including terpolymers and higher polymers.

After polymerization, oxymethylene polymers, such as those comprising trioxane-ethylene oxide copolymer chains, contain unstable polyformaldehyde ends, which must be removed in order to improve the thermal stability and other properties of the acetal copolymer. For this purpose, a hydrolysis process, such as that disclosed in U.S. Pat. No. 3,219,623, incorporated herein by reference, may be used. More specifically, a melt hydrolysis process, such as that disclosed in U.S. Pat. Nos. 3,318,848 and 3,418,280, incorporated herein by reference, is preferably utilized.

In the past, it was very difficult to remove enough volatile material (e.g. trioxane, formaldehyde, formic acid, water, hydrolysis agent, etc.) to provide a product suitable for direct use. Subsequent devolatilization and compounding were required to remove volatiles in separate steps, to avoid excessive color formation.

The presence of too high a level of formaldehyde leads to a material which can easily form mold deposits. These mold deposits may be of a paraformaldehyde type that result from residual formaldehyde in the polymer. The presence of a significant amount of formaldehyde can also lead to yellowing of the polymer by a number of possible mechanisms. Aldol condensation of formaldehyde, followed by dehydration, forms resin with increased color. This can necessitate frequent corrective action in a liquid phase polymer process. When the oxymethylene polymer is in slurry form, polymer color is highly affected by iron and other cations. Hydrolysis agents such as triethylamine, which can be used to control pH, readily increase color when the concentrations of formaldehyde and hydrolysis agent exceed the recommended limits during processing.

Color in oxymethylene polymers may also be induced by oxidation, which can result from exposure to air or from high formaldehyde content. This would indicate that oxidation reactions either produce chromophors (radicals which can lead to color formation) or that the reactions produce formaldehyde, which can generate chromophors. In processes for producing oxymethylene polymers, it is also known that color is induced by high process temperatures as well as by high formaldehyde content. Because the presence of heat and formaldehyde provides a product which has a high potential for the formation of color, removing formaldehyde and minimizing the heat history of the polymer will minimize color formation in oxymethylene polymers.

Accordingly, there exists a need in the art for a method of devolatilizing oxymethylene polymers to remove formaldehyde and other volatile materials, such as triethylamine, water and catalyst residues, thereby reducing the formation of mold deposits, minimizing color formation and providing a more stable oxymethylene polymer which can be readily extruded or molded into shaped articles. The process of the present invention provides an answer to that need and also allows the addition of stabilizers without the necessity for remelting and substantially avoids the formation of excessive color.

SUMMARY OF THE INVENTION

A process for removing formaldehyde and other volatile materials from a molten oxymethylene polymer is provided according to which molten polymer is passed through a rotating disk polymer processor having at least three stages—a first devolatilization stage (first stage), then a first stabilization stage (second stage) and then a last devolatilization stage (third or last stage). When an oxymethylene copolymer is employed in the present process, it is preferably hydrolyzed before it is subjected to devolatilization.

The polymer in the first devolatilization stage is maintained at a temperature above its melting point, in the range of from about 160° C. to about 220° C. and at a vapor space pressure of from about .1 to about 300 Torr. The polymer in the stabilization stage is maintained in the molten state at a temperature of from about 160° C. to about 220° C. The vapor space pressure in the stabilization stage is not critical, since it is a holding stage during which stabilizers and other additives may be added to the molten polymer. Whatever vapor space pressure would facilitate, or at least not inhibit, the flow of stabilizer may be utilized, usually not too far from atmospheric pressure, i.e. about 500 to about 2000 Torr, preferably about 600 to about 1000 Torr. The polymer in the last devolatilization stage is maintained in the molten state at a temperature of from about 160° C. to about 190° C. and at a vapor space pressure of from about 0.1 to about 100 Torr.

The maximum total residence time in the polymer processor is desirably from about 10 to about 120 seconds, preferably from about 10 to about 90 seconds and most preferably from about 10 to about 45 seconds. It will be recognized that as the number of stages in the claimed process increases, the residence time will normally increase. The process is capable of producing a molten oxymethylene polymer having an extractable formaldehyde level of less than about 250 parts per million and in an optimized process, less than about 150 parts per million, based on the weight of the molten oxymethylene polymer, and a natural color, as measured by Hunter "b" value, of less than about 5, preferably less than about 3.

BRIEF DESCRIPTION OF THE DRAWINGS

FIG. I is a schematic longitudinal cut-a-way view of a three stage rotary disk polymer processor.

FIG. II is a schematic longitudinal cut-a-way view of a six stage rotary disk polymer processor.

DESCRIPTION OF PREFERRED EMBODIMENTS

Figure 1:
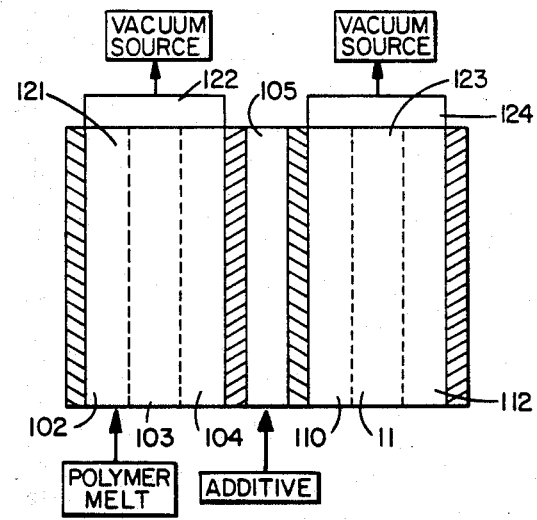
Figure 2:
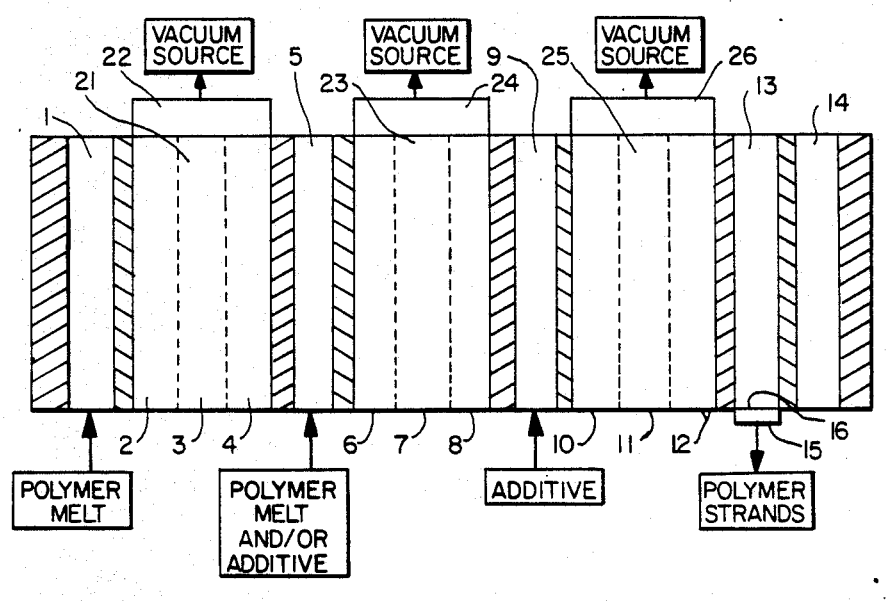

The process of the present invention removes formaldehyde and other volatile materials, such as triethylamine and water from molten, extrudable and moldable oxymethylene polymers. The process comprises passing molten oxymethylene polymer through a rotary disk polymer processor having at least three stages.

The process requires a disk polymer processor, or equivalent, having at least three stages, with each stage performing a separate function as follows:

Stage 1: The first stage provides a moderate devolatilization with a low residence time. This stage removes most of the acid residues, formaldehyde and moisture while maintaining a substantially oxygen-free environment to inhibit additional formation of formaldehyde and acid. Residence time is low and the temperature is controlled to minimize heat history, because the polymer is especially sensitive to backbone scission degradation at this point. The polymer temperature can be controlled by circulating coolant through the polymer processor, to minimize such backbone scission reactions. Good vacuum is maintained to maximize devolatilization efficiency.

Stage 2: In this stage, vapor space pressure is normally maintained at about atmospheric pressure or slightly above to make sure that oxygen is excluded. Stabilizers, which normally include an antioxidant, such as a hindered phenol, and a scission inhibitor, such as a trivalent nitrogen compound (e.g. amidines such as melamine, cyaoguanidine, benzoguanamine or derivatives thereof), are normally added in this stage.

Stage 3: In this stage the molten oxymethylene polymer is further devolatilized to remove formaldehyde and other volatiles. A good vacuum is employed in this stage. Use of a high shear rate is minimized and the polymer is maintained in the molten state at a temperature that is controlled to minimize thermal degradation which leads to the production of more formaldehyde. The maximum allowable temperature is affected by the scission inhibitor which was used. Temperature control may be accomplished by circulating coolant in the polymer processor.

The vapor space pressure in the first devolatilization stage may range from about 0.1 to about 300 Torr, preferably from about 1 to about 100 Torr and most preferably from about 5 to about 50 Torr. In the second stage (first stabilization stage), in order to exclude oxygen, the vapor space pressure is maintained at about atmospheric or slightly above atmospheric pressure, preferably from about 500 to about 2000 Torr, most preferably from about 600 to about 1000 Torr. The last devolatilization stage is maintained at a vapor space pressure of from about 0.1 to about 100 Torr, preferably from about 0.1 to about 50 Torr and for optimum devolatilization tion efficiency, from 0.1 to about 20 Torr.

Throughout the process the polymer is maintained in the molten state at a temperature within the range of about 160° C. to about 220° C. In the last devolatilization stage the molten polymer should be maintained within the range of from about 160° C. to about 190° C., preferably from about 160° C. to about 175° C., to minimize thermal degradation.

In a preferred embodiment, a rotary disk polymer processor may be utilized which has hollow disks within which coolant may be circulated to maximize its temperature control and heat removal capabilities. Each disk preferably contains a circulating heat transfer fluid in its hollow core, to control the temperature of the molten oxymethylene polymer. The circulating heat transfer fluid and disk surface area must provide temperature control capability sufficient to adjust the temperature of the molten polymer feed to the optimum devolatilization temperature. The heat transfer capacity must also be sufficient to remove heat generated by mechanical shear imparted to the polymer during the course of melt processing.

A preferred process utilizes a rotary disk polymer processor having at least six stages. These include: (1) a feed stage for smoothing out flow variations to provide smoother processor operation, (2) a first devolatilization stage, (3) a stabilization stage, (4) a second devolatilization stage, (5) a holding stage to minimize surging and (6) a pumping stage for pressuring polymer through the extrusion die. A third devolatilization stage and a second stabilization stage may also be added to provide an eight stage process.

Throughout the process the molten oxymethylene polymer is maintained at a temperature of from about 160° C. to about 220° C. In the second devolatilization stage the vapor space pressure is maintained in the range from about 0.1 to about 100 Torr, preferably from about 0.1 to about 50 Torr, most preferably from about 0.1 to about 20 Torr. The vapor space pressure in the second stabilization stage is not critical and the stabilization stages are normally maintained at about the same vapor space pressure, i.e. at or slightly above atmospheric pressure, preferably from about 500 to about 2000 Torr, most preferably from about 600 to about 1000 Torr. The vapor space pressures in the feed stage, holding stage and pumping stage are not critical. The feed stage and holding stage polymer vapor space pressures are normally maintained in the range from about 500 to about 2000 Torr, preferably at about atmospheric pressure. The pumping stage is maintained at a positive vapor space pressure to facilitate pumping the molten polymer through the die.

Rotary disk polymer processors particularly suitable for use in practicing the process of the present invention are described in U.S. Pat. Nos. 4,142,805, 4,194,841 and 4,529,320, each of which is incorporated by this reference. However, other equivalent polymer processors known to those skilled in the art or subsequently developed may be used in the process of the present invention and are included within the scope of the present invention.

The invention will now be described with reference to the drawings.

FIG. I is a schematic longitudinal cutaway view of a three stage rotary disk polymer processor. Polymer flows through the 7 channels of the devolatilizer in series beginning with channel 102, which is equipped for the introduction of a polymer feed. Channels 102, 103 and 104 form the first devolatilization zone 121, which is connected to a vacuum zone 122. Channels 110, 111 and 112 form the second devolatilization zone 123, which is connected to a vacuum zone 124. The polymer is conveyed from channel 112 for further processing.

FIG. II is a schematic longitudinal cutaway view of a six-stage rotary disk polymer processor. Polymer flows through the 14 channels of the devolatilizer in series beginning with either channel 1 or 5 (first and second stabilization zones), all of which are equipped for the introduction of polymer feed and/or stabilizer. Channels 2, 3 and 4 form the first devolatilization zone 21, which is connected to a vacuum zone 22; channels 6, 7 and 8 form the second devolatilization zone 23, which is connected to a vacuum zone 24, and channels 10, 11 and 12 form the third devolatilization zone 25, which is connected to a vacuum zone 26. After channel 12, the polymer is conveyed around to channel 14 (the holding or homogenizing channel), which serves to maintain a constant flow to the pump channel 13.

The die 15 is attached to the outlet end 16 of the pump channel 13.

The number of revolutions per minute (RPM) of the disks of the rotating disk polymer processor utilized in the present process is not critical. However, if the RPM is too low, the flow of polymer will be so slow that the machine will flood. If the RPM is too high, it will be extremely difficult to maintain proper control of the polymer temperature.

In contrast to other thermoplastic engineering resins in the prior art, such as nylon and polyester, it is believed that in the present process the mass transport of volatiles in a molten polyoxymethylene is not governed or limited by film thickness. In fact, it has been found that a thick film may increase devolatilization efficiency. While not wishing to be bound by any theory, in a molten polyoxymethylene the mass transport of volatiles may be explained by bubble mechanics or bubble transport theory where bubbles containing volatiles are continuously formed and ruptured, as disclosed in a paper by P. S. Mehta, L. N. Valsamis and Z. Tadmor published in *Polymer Process Engineering*, Vol. 2, Nos. 2 & 3, pp. 103-128, entitled *Foam Devolatilization in a Multi-Channel Corotating Disk Processor*.

The following Examples are given as specific illustrations of the claimed invention. It should be understood, however, that the specific details set forth in the examples are merely illustrative and not limitative. All parts and percentages in the Examples are by weight of the total composition, unless otherwise specified.

Polymer Preparation

An oxymethylene copolymer containing about 98 weight percent of recurring —OCH$_2$— groups derived from trioxane and about 2 weight percent of comonomer units having the formula —OCH$_2$CH— and derived from ethylene oxide was prepared as described in the aforementioned U.S. Pat. No. 3,027,352, and melt hydrolyzed according to the procedure described in the aforementioned U.S. Pat. Nos. 3,318,848 and 3,418,280 to stabilize the ends of the polymer chains. The oxymethylene copolymer possessed a crystallinity of approximately 60 percent, a number average molecular weight ($m_n$) of approximately 25,000, an inherent viscosity (I.V.) of approximately 1.0 (measured at 60° C. in a 0.1 weight percent solution in p-chlorophenol containing 2 weight percent of alphapinene), softening temperature of about 160° C., and a Melt Index ranging from about 7.6 g./10 min. to 9.3 g./10 min. when tested in accordance with ASTM method D1238-82.

The oxymethylene copolymer also contained, as a stabilizer, about 0.2 weight percent of a conventional hindered phenol type antioxidant.

In the following Examples, the parameters and values shown are average values for a one-hour run, unless otherwise indicated.

EXAMPLE 1

Molten oxymethylene copolymer prepared as described above, having a Melt Index of about 9.3, an initial Hunter b color of 1.5 and an extractable formaldehyde level of about 730 PPM, was fed to the first stage of a rotating disk polymer processor. The molten polymer was fed to the polymer processor at a temperature of about 209° C. The disk processor utilized had an internal diameter of 200 mm. and contained six stages, as described above. The molten polymer entered the feed stage at a feed rate of about 82 kilograms per hour and the disks of the rotary disk processor were rotating at about 30 revolutions per minute. In the first stabilization stage, additional stabilizer was added (0.3% of a conventional hindered phenol type antioxidant, 0.1% of a conventional thermal stabilizer, 0.2% of a conventional lubricant and 0.5% of a nucleating agent. The total polymer residence time through the disk processor was about 40 seconds. The temperature of the oil circulated within the outer shell of the polymer processor (barrel oil temperature) was about 182° C. The oil temperature in the rotating disks (rotor oil temperature) was about 165° C.

The temperature and pressure conditions for each of the six stages are shown below in Table 1:

TABLE 1

| Stage | 1 | 2 | 3 | 4 | 5 | 6 |
|---|---|---|---|---|---|---|
| Temp. °C. | 209 | 192 | 187 | 187 | 198 | 183 |
| Vapor Space Press. (Torr) | 760 | 36 | 1000 | 19 | 760 | 760 |

The devolatilized molten oxymethylene polymer was pumped from stage 6 through a die maintained at a temperature of about 205° C. and having a die pressure of about 714 psig. The strands were passed through a water bath maintained at a temperature of about 45° C. to solidify the molten polymer. The solidified strands were then passed through an air knife to a pelletizer operating at about 59 RPM to produce the final product in pellet form. The extractable formaldehyde level of the final product was about 220 parts per million (PPM), the final Hunter b color was 1.5 and the final Melt Index was about 9.4.

EXAMPLE 2

Molten oxymethylene copolymer, having a Melt Index of about 8.7, an initial Hunter b color of 1.6 and an extractable formaldehyde level of about 750 PPM, prepared as described above was fed to the feed stage of a six stage disk polymer processor. The molten polymer was fed to the polymer processor at a temperature of about 213° C. The molten polymer entered the first stage at a feed rate of about 91 kilograms per hour and the disks of the rotary disk processor were rotating at about 50 revolutions per minute. In the first stabilization stage, stabilizer was added as in Example 1. The total polymer residence time through the disk processor was about 35 seconds. The barrel oil temperature was about 143° C. and the rotor oil temperature was about 144° C.

The temperature and pressure conditions for each of the six stages are shown below in Table 2:

TABLE 2

| Stage | 1 | 2 | 3 | 4 | 5 | 6 |
|---|---|---|---|---|---|---|
| Temp. °C. | 213 | 191 | 174 | 178 | 184 | 165 |
| Vapor Space Press. (Torr) | 760 | 32 | 1000 | 12 | 760 | 760 |

The devolatilized molten polymer was pumped from stage 6 through a die maintained at about 205° C. and having a die pressure of about 847 psig. The strands were passed through a water bath maintained at a temperature of about 45° C. to solidify the molten polymer. The solidified strands were then passed through an air knife and a pelletizer operating at about 59 RPM to produce the final product in pellet form. The extractable formaldehyde level of the final product was about 160 PPM, the final Hunter b color was 1.7 and the Melt Index was about 8.8.

EXAMPLE 3

Molten oxymethylene copolymer prepared as described above, having a Melt Index of about 7.6, an initial Hunter b color of 1.4 and an extractable formaldehyde level of about 690 PPM, was fed to the feed stage of a six stage disk polymer processor. The molten polymer was fed to the polymer processor at a temperature of about 209° C. The molten polymer entered the first stage at a feed rate of about 118 kilograms per hour and the disks of the rotary disk processor were rotating at about 50 revolutions per minute. In the first stabilization stage, stabilizer was added as in Example 1. The total polymer residence time through the disk processor was about 25 seconds. The barrel oil temperature was about 127° C. and the rotor oil temperature was about 128° C.

The temperature and pressure conditions for each of the six stages are shown below in Table 3:

TABLE 3

| Stage | 1 | 2 | 3 | 4 | 5 | 6 |
|---|---|---|---|---|---|---|
| Temp. °C. | 209 | 188 | 172 | 177 | 188 | 166 |
| Vapor Space Press. (Torr) | 760 | 24 | 1000 | 19 | 760 | 760 |

The devolatilized molten polymer was pumped from stage 6 through a die maintained at about 207° C. and having a die pressure of about 951 psig. The strands were passed through a water bath maintained at a temperature of about 45° C. to solidify the molten polymer. The solidified strands were then passed through an air knife and a pelletizer operating at about 59 RPM to produce the final product in pellet form. The extractable formaldehyde level of the final product was about 160 PPM, the final Hunter b color was 2.1 and the Melt Index was about 9.1.

EXAMPLE 4

Molten oxymethylene copolymer prepared as described above and having a Melt Index of about 7.6, an initial Hunter b color of 1.4 and an extractable formaldehyde level of about 690 PPM was fed to the feed stage of a six stage disk polymer processor. The molten polymer was fed to the polymer processor at a temperature of about 214° C. The molten polymer entered the first stage at a feed rate of about 59 kilograms per hour and the disks of the rotary disk processor were rotating at about 30 revolutions per minute. In the first stabilization stage, stabilizer was added as in Example 1. The total polymer residence time through the disk processor was about 45 seconds. The barrel oil temperature was about 166° C. and the rotor oil temperature was about 149° C.

The temperature and pressure conditions for each of the six stages are shown below in Table 4:

TABLE 4

| Stage | 1 | 2 | 3 | 4 | 5 | 6 |
|---|---|---|---|---|---|---|
| Temp. °C. | 214 | 186 | 173 | 175 | 178 | 166 |
| Vapor Space Press. (Torr) | 760 | 33 | 1000 | 19 | 760 | 760 |

The devolatilized molten polymer was pumped from stage 6 through a die maintained at about 191° C. and having a die pressure of about 742 psig. The strands were passed through a water bath maintained at a temperature of about 45° C. to solidify the molten polymer. The solidified strands were then passed through an air knife and a pelletizer operating at about 59 RPM to produce the final product in pellet form. The extractable formaldehyde level of the final product was about 140 PPM, the final Hunter b color was 1.8 and the Melt Index was about 9.1.

EXAMPLE 5

Molten oxymethylene copolymer prepared as described above, having a Melt Index of about 8.0, an initial Hunter b color of 2.1 and an extractable formaldehyde level of about 750 PPM, was fed to the feed stage of a six stage disk polymer processor. The molten polymer was fed to the polymer processor at a temperature of about 215° C. The molten polymer entered the first stage at a feed rate of about 59 kilograms per hour and the disks of the rotary disk processor were rotating at about 30 revolutions per minute. In the first stabilization stage, stabilizer was added as in Example 1. The total polymer residence time through the disk processor was about 45 seconds. The barrel oil temperature was about 182° C. and the rotor oil temperature was about 165° C.

The temperature and pressure conditions for each of the six stages are shown below in Table 5:

TABLE 5

| Stage | 1 | 2 | 3 | 4 | 5 | 6 |
|---|---|---|---|---|---|---|
| Temp. °C. | 215 | 195 | 184 | 184 | 191 | 182 |
| Vapor Space Press. (Torr) | 760 | 36 | 1000 | 19 | 760 | 760 |

The devolatilized molten polymer was pumped from stage 6 through a die maintained at about 203° C. and having a die pressure of about 771 psig. The strands were passed through a water bath maintained at a temperature of about 45° C. to solidify the molten polymer. The solidified strands were then passed through an air knife and a pelletizer operating at about 59 RPM to produce the final product in pellet form. The extractable formaldehyde level of the final product was about 200 PPM, the final Hunter b color was 2.4 and the Melt Index was about 7.2.

EXAMPLE 6

Molten oxymethylene copolymer prepared as described above, having a Melt Index of about 9.3, an initial Hunter b color of 1.9 and an extractable formaldehyde level of about 690 PPM, was fed to the feed stage of a six stage disk polymer processor. The molten polymer was fed to the polymer processor at a temperature of about 208° C. The molten polymer entered the first stage at a feed rate of about 82 kilograms per hour and the disks of the rotary disk processor were rotating at about 30 revolutions per minute. In the first stabilization stage, stabilizer was added as in Example 1. The total polymer residence time through the disk processor was about 40 seconds. The barrel oil temperature was about 166° C. and the rotor oil temperature was about 149° C.

The temperature and pressure conditions for each of the six stages are shown below in Table 6:

TABLE 6

| Stage | 1 | 2 | 3 | 4 | 5 | 6 |
|---|---|---|---|---|---|---|
| Temp. °C. | 208 | 188 | 176 | 179 | 181 | 168 |
| Vapor Space Press. (Torr) | 760 | 34 | 1000 | 19 | 760 | 760 |

The devolatilized molten polymer was pumped from stage 6 through a die maintained at about 188° C. and having a die pressure of about 1040 psig. The strands were passed through a water bath maintained at a temperature of about 45° C. to solidify the molten polymer. The solidified strands were then passed through an air knife and a pelletizer operating at about 59 RPM to produce the final product in pellet form. The extractable formaldehyde level of the final product was about 140 PPM, the final Hunter b color was 2.0 and the Melt Index was about 9.2.

EXAMPLE 7

A portion of the molten oxymethylene copolymer prepared as described above, having a Melt Index of about 8.9, an initial Hunter b color of 2.2 and an extractable formaldehyde level of about 730 PPM was fed to the feed stage of a six stage disk polymer processor. The molten polymer was fed to the polymer processor at a temperature of about 212° C. The molten polymer entered the first stage at a feed rate of about 91 kilograms per hour and the disks of the rotary disk processor were rotating at about 50 revolutions per minute. In the first stabilization stage, stabilizer was added as in Example 1. The total polymer residence time through the disk processor was about 35 seconds. The barrel oil temperature was about 127° C. and the rotor oil temperature was about 128° C.

The temperature and pressure conditions for each of the six stages are shown below in Table 7:

TABLE 7

| Stage | 1 | 2 | 3 | 4 | 5 | 6 |
|---|---|---|---|---|---|---|
| Temp. °C. | 212 | 188 | 168 | 173 | 182 | 159 |
| Vapor Space Press. (Torr) | 760 | 27 | 1000 | 18 | 760 | 760 |

The devolatilized molten polymer was pumped from stage 6 through a die maintained at about 205° C. and having a die pressure of about 921 psig. The strands were passed through a water bath maintained at a temperature of about 45° C. to solidify the molten polymer. The solidified strands were then passed through an air knife and a pelletizer operating at about 59 RPM to produce the final product in pellet form. The extractable formaldehyde level of the final product was about 130 PPM, the final Hunter b color was 1.7 and the Melt Index was about 8.7.

EXAMPLE 8

A portion of the molten oxymethylene copolymer prepared as described above, having a Melt Index of about 9.3, an initial Hunter b color of 1.8 and an extractable formaldehyde level of about 790 PPM was fed to the feed stage of a six stage disk polymer processor. The molten polymer was fed to the polymer processor at a temperature of about 211° C. The molten polymer entered the first stage at a feed rate of about 127 kilograms per hour and the disks of the rotary disk processor were rotating at about 50 revolutions per minute. In the first stabilization stage, stabilizer was added as in Example 1. The total polymer residence time through the disk processor was about 25 seconds. The barrel oil temperature was about 143° C. and the rotor oil temperature was about 144° C.

The temperature and pressure conditions for each of the six stages are shown below in Table 8:

TABLE 8

| Stage | 1 | 2 | 3 | 4 | 5 | 6 |
|---|---|---|---|---|---|---|
| Temp. °C. | 211 | 193 | 179 | 186 | 192 | 171 |

TABLE 8-continued

| Stage | 1 | 2 | 3 | 4 | 5 | 6 |
|---|---|---|---|---|---|---|
| Vapor Space Press. (Torr) | 760 | 26 | 1000 | 19 | 760 | 760 |

The devolatilized molten polymer was pumped from stage 6 through a die maintained at about 206° C. and having a die pressure of about 1200 psig. The strands were passed through a water bath maintained at a temperature of about 45° C. to solidify the molten polymer. The solidified strands were then passed through an air knife and a pelletizer operating at about 59 RPM to produce the final product in pellet form. The extractable formaldehyde level of the final product was about 210 PPM, the final Hunter b color was 3.6 and the Melt Index was about 9.9.

We claim:

1. A process for removing volatile materials from a molten oxymethylene polymer, comprising passing the molten polymer through a rotating disk polymer processor having at least three stages, the three stages comprising in sequence a first devolatilization stage, a stabilization stage and a last devolatilization stage, the molten polymer in the first devolatilization stage being maintained at a temperature above its melting point in the temperature range of from about 160° C. to about 220° C. and at a vapor space pressure of from about 0.1 to about 300 Torr, the polymer in the stabilization stage being maintained in the molten state at a temperature of from 160° C. to about 220° C., the polymer in the last devolatilization stage being maintained in the molten state at a temperature of from about 160° C. to 190° C. and at a vapor space pressure of from about 0.1 to about 100 Torr.

2. The process of claim 1 further including passing the molten oxymethylene polymer through a feed stage prior to the first devolatilization stage, and, after the last devolatilization stage, passing said molten polymer through a holding stage, and then a pumping stage.

3. The process of claim 2 further including passing the molten oxymethylene polymer through a second devolatilization stage, and then a second stabilization stage, prior to the last devolatilization stage and before the holding stage.

4. The process of claim 3 wherein the molten polymer in the second devolatilization stage is maintained at a temperature of from about 160° C. to about 220° C. and at a vapor space pressure of from about 0.1 to about 100 Torr.

5. The process of claim 4 wherein the vapor space pressure in the second devolatilization stage is maintained in the range from about 0.1 to about 50 Torr.

6. The process of claim 4 wherein the vapor space pressure in the second devolatilization stage is maintained in the range from about 0.1 to about 20 Torr.

7. The process of claim 1 wherein the vapor space pressure in the first devolatilization stage is maintained at about 1 to about 100 Torr.

8. The process of claim 1 wherein the vapor space pressure in the stabilization stage is maintained in the range from about 500 to about 2000 Torr.

9. The process of claim 1 wherein the vapor space pressure in the last devolatilization stage is maintained in the range from about 0.1 to about 50 Torr.

10. The process of claim 1 wherein the vapor space pressure in the last devolatilization stage is maintained in the range from about 0.1 to about 20 Torr.

11. The process of claim 1 wherein the temperature in the last devolatilization stage is within the range of from about 160° C. to about 175° C.

* * * * *